(12) United States Patent
Meier

(10) Patent No.: US 8,072,228 B2
(45) Date of Patent: Dec. 6, 2011

(54) ANGLE MEASURING DEVICE

(75) Inventor: Dietrich Meier, Niedererlinsbach (CH)

(73) Assignee: Leica Geosystems AG, Heerbrugg (CH)

( * ) Notice: Subject to any disclaimer, the term of this patent is extended or adjusted under 35 U.S.C. 154(b) by 702 days.

(21) Appl. No.: 12/278,796

(22) PCT Filed: Jan. 31, 2007

(86) PCT No.: PCT/CH2007/000049
§ 371 (c)(1),
(2), (4) Date: Nov. 3, 2008

(87) PCT Pub. No.: WO2007/090309
PCT Pub. Date: Aug. 16, 2007

(65) Prior Publication Data
US 2009/0102492 A1 Apr. 23, 2009

(30) Foreign Application Priority Data
Feb. 8, 2006 (CH) .......................................... 196/06

(51) Int. Cl.
*G01R 27/26* (2006.01)
(52) U.S. Cl. .......................... 324/661; 324/644; 324/658
(58) Field of Classification Search .................... 324/661
See application file for complete search history.

(56) References Cited

U.S. PATENT DOCUMENTS

| 4,119,375 A | * | 10/1978 | Kirk et al. ...................... 384/104 |
| 4,309,062 A | * | 1/1982 | Bischoff ........................ 384/205 |
| 4,455,758 A | | 6/1984 | Iwafune et al. |
| 5,000,585 A | * | 3/1991 | Hoffmann et al. ............. 384/129 |

FOREIGN PATENT DOCUMENTS
EP          0 369 416 A2    5/1990
* cited by examiner

*Primary Examiner* — Thomas Valone
(74) *Attorney, Agent, or Firm* — Rankin, Hill & Clark LLP

(57) ABSTRACT

An angle measuring device for optical angle measurement has a telescope body 5 which is rotatably mounted around at least one shaft (1, 2; 11), wherein the shaft (1, 2; 11) is rotatably mounted at least two bearing points 6, and the bearing points 6 are at a distance from one another in the direction of the shaft (1, 2; 11). In this case, at least two sensor arrangements for detecting the position of the shaft (1, 2; 11) are respectively arranged at a measurement point along the shaft (1, 2; 11), wherein the measurement points are at a distance from one another in the direction of the shaft (1, 2; 11). At least one of the sensor arrangements has a group of capacitive sensors (7a, 7b, 7c, 7d) which detect a displacement of the shaft (1, 2; 11) in directions perpendicular to the axial direction at the measurement point.

10 Claims, 1 Drawing Sheet

ANGLE MEASURING DEVICE

BACKGROUND OF THE INVENTION

The invention relates to the field of optical angle measurement apparatus.

Angle measurement apparatus are used, for example, as pure theodolites for measuring angles, or, combined for example with electro-optical distance measurement apparatus, as part of a coordinate measurement system. In a theodolite, the horizontal pivot typically has a V-bearing, i.e. a friction bearing with two defined contact points. The V-bearing however has the disadvantage that it may only be loaded in one direction, which prevents a non-perpendicular set-up, and renders the motoric drive more difficult on account of the changing drive force direction.

Other bearings with a low radial play are air bearings and stressed ball bearings. Apparatus such as laser trackers comprise stressed ball bearings. Whereas air bearings are awkward and large, the stressed ball bearings have the disadvantage that the balls no longer roll in an ideal manner, since they have to be stressed to a very great extent on account of the demand for a minimal radial deviation error. The influence of the temperature on the stressing, depending on the material selection, entails further complications.

BRIEF DESCRIPTION OF THE INVENTION

It is therefore the object of the invention to provide an angle measurement apparatus of the initially mentioned type, which overcomes the mentioned disadvantages of the pivot mounting.

The angle measurement apparatus for the optical angle measurement, thus, includes a telescope body which is rotatably mounted about an axis, with an angle encoder. The telescope body may be equipped with a telescopic sight, an electronic camera, laser-optical distance meters, etc. of a generally known type. Thereby, the pivot is rotatably mounted at least two bearing locations, and these bearing locations are distanced to one another in the direction of the pivot. At least two sensor arrangements for detecting the exact position of the pivot are arranged in each case at a measurement location along the pivot, wherein the measurement locations are distanced to one another in the direction of the pivot. At least one of the sensor arrangements comprises a group of capacitive sensors, which at the measurement location, detect a displacement of the pivot in directions perpendicular to the axial direction.

With this, it is possible to operate with a normal tensioning (stressing) of the ball bearings, which means one which is not particularly great. Thus an easy rolling of the balls on points of the ball surface which are diametrically opposite, is ensured.

One point on the pivot may, thereby, move in a plane perpendicular to the axial direction on account of bearing inaccuracies. This movement is detected by the sensor arrangement in each case at a measurement location. Since two measurement locations are present, the position or the displacement of two points of the pivot and, thus, also the position of the displaced pivot as a whole is known. This position is taken into account on computation of the viewing direction of the telescope body or the telescopes and/or distance meters which are arranged therein (apart from the rotation angle about one or two axes by way of angle encoders, determined in the usual manner). This means that the viewing direction of the telescope body is determined on the one hand from the rotations about the axes, and on the other hand a correction is carried out according to the position of the pivot which is determined according to the invention. Further corrections of the apparatus geometry on account of temperature measurements, for example, may be carried out in the known manner.

In a preferred embodiment of the invention, each of the sensor arrangements includes a first sensor pair and a second sensor pair with, in each case, two capacitive sensors, wherein the first sensor pair measures a displacement of the pivot in a first direction orthogonally to the axial direction, the second sensor pair measures a displacement of the pivot in a second direction orthogonally to the axial direction, and the first and second direction are essentially orthogonal to one another. The position evaluations in the two directions are decoupled from one another by way of the orthogonal alignment of the sensor pairs.

However, it is alternatively also possible to use more or less sensors: For example, one may apply only a single sensor or a single sensor pair, in order to measure the displacement of the pivot in only one direction. Or three sensors are arranged in a triangular arrangement about the pivot, and the displacement of the pivot is determined in the two directions from the entirety of the three sensor capacitances. One may also apply five or six sensors. The variant with two orthogonal sensor pairs, which is presented in detail, is however particularly simple with regard to the evaluation.

In a further preferred embodiment of the invention, in at least one of the sensor arrangements, in each case a first sensor of the first sensor pair and a first sensor of the second sensor pair are arranged on a first sensor element carrier, and in each case a second sensor of the first sensor pair and a second sensor of the second sensor pair are arranged on a second sensor element carrier. This renders it possible to adjust in each case two sensors to the position of the pivot, wherein the adjustment of two sensors of a pair is effected, in each case, independently of one another. Since the two sensors are orthogonal to one another on the same carrier, their position with respect to the pivot may likewise be set essentially independently of one another by way of displacing the carrier.

In a further, preferred embodiment of the invention, the sensors in each case between the pivot and an electrode form a capacitance in accordance with the distance between the pivot and the electrode. Thereby, the pivot is preferably applied to earth, seen electrically. The circuiting and evaluation of the sensor capacitances may be designed in a particularly simple manner by way of this.

The measurement device according to the invention may be applied with several axes of an angle measurement apparatus, in particular with a horizontal axis (or zenith axis) and/or with a vertical axis (or azimuth axis).

In a preferred embodiment of the invention, the angle measurement apparatus includes an electronic circuit, which for at least one of the sensor pairs, is designed for producing a first signal in accordance with the capacitance of the first sensor, and a second signal in accordance with the capacitance of the second sensor, as well as for forming a difference signal from the first and the second signal. With this, the difference signal is a measure for the displacement of the pivot in the direction between the first and the second sensor.

Further preferred embodiments are to be deduced from the dependent patent claims.

BRIEF DESCRIPTION OF THE DRAWINGS

Hereinafter, the subject-matter of the invention is explained in more detail by way of a preferred embodiment example, which is represented in the accompanying drawings. In each case, there are schematically shown in.

The reference numerals which are used in the drawings and their significance are listed in a conclusive manner in the list of reference numerals. Basically, the same parts are provided with the same reference numerals in the figures.

DETAILED DESCRIPTION OF THE INVENTION

Figure 1:
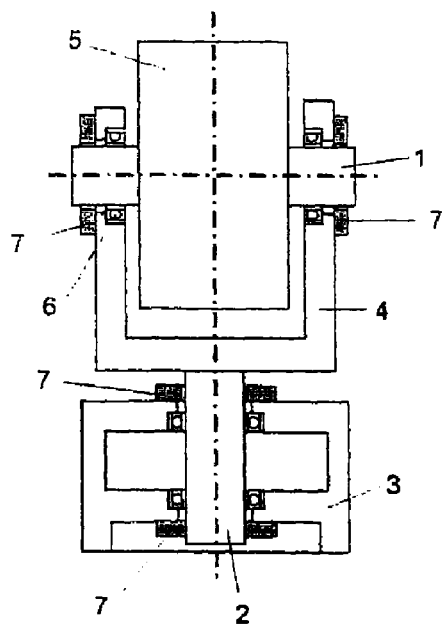
FIG. 1 a lateral view of an angle measurement apparatus with pivot position sensors.

FIG. 1 shows a lateral view of an angle measurement apparatus with pivot position sensors. Thereby, a telescope body 5 is rotatably mounted about a horizontal pivot 1 in a support 4. The support 4 is rotatably mounted about a vertical pivot 2 in a base 3. The mounting in each case comprises ball bearings 6. The two axes 1, 2 are provided in each case with capacitive sensors 7, which are arranged in pairs or individually, distanced to one another in the axial direction. Preferably, the sensors 7 are in each case arranged at the bearings 6 of the axes 1, 2. The lateral deviations from the pivot are measured via the capacitance changes of the sensors 7, and are converted into an angle correction of the pivot position. The angle meter or the angle encoders for measuring the rotation angle about the respective pivots, as well as possible motoric pivot drives, are not shown.

Figure 2:
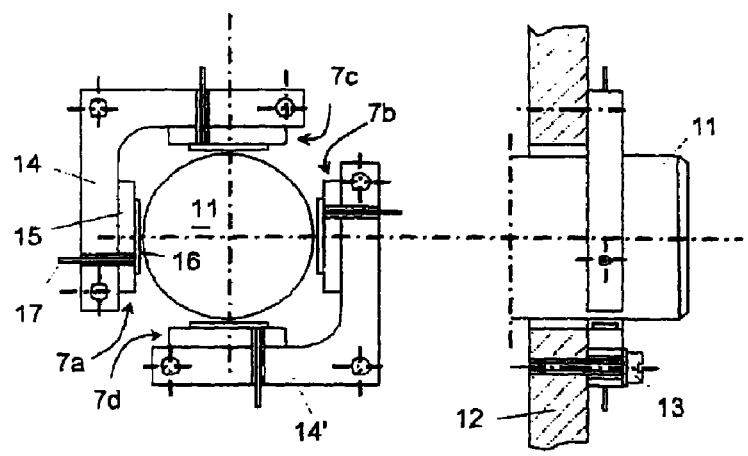
FIG. 2 a detailed view of pivot position sensors.

FIG. 2 shows a detailed view of pivot position sensors. The left side of the figure shows a plan view in the axial direction, and the right side shows a cross section, wherein the axial direction lies in the plane of the paper. Two sensor element carriers 14, 14', with fastening means such as screws 13, for example, are fastened on a base carrier 12 (only shown in cross section). This fastening is adjustable, so that the distances between the sensors 7 and the pivot 11 may be set. Thereby, the air gap between the pivot 11 and an electrode 16 of a sensor 7 forms a capacitance. The distance of the electrode 16 to the pivot 11 is set in each case via a displacement of the carrier 14, for example to approx. 15 micrometers. A basic capacitance of approx. 3-4 pF results with a pivot diameter of 28 mm, and with an electrode width of 3 mm and a length of 10 mm.

The pivot 11 may be the horizontal pivot 1 or the vertical pivot 2. Each of the sensors 7a, 7b, 7c, 7d comprises an electrode 16 which is fastened on a sensor element carrier 14 in an insulated manner via an insulator 15, and is electrically connected to evaluation electronics via an electrode connection lead 17. The insulator 15, for reasons of mechanical accuracy and resistance, is preferably of a ceramic material. The pivot 11 is electrically connected to an earth connection of the evaluation electronics.

With the measurement of the angle position of a pivot by way of a 4-fold circle read-out or a fourfold sensor, this type of angle measurement may also provide information on the displacement of the pivot, and, thus, likewise serves as a sensor arrangement for this purpose. In this case, one only further requires an additional capacitive sensor arrangement of the above type, which is distanced in the axial direction, in order to completely determine the position of the pivot.

Figure 3:
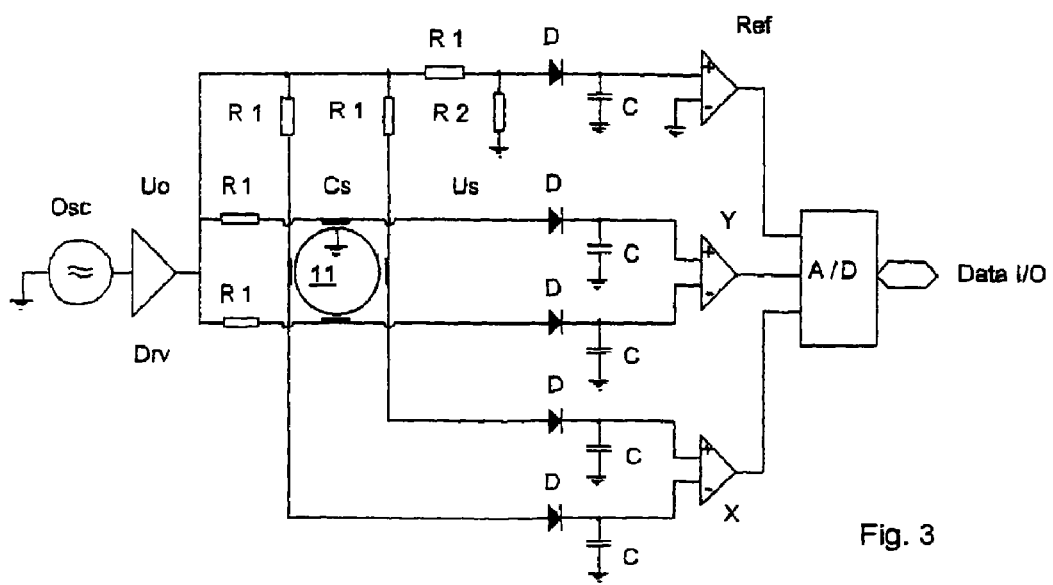
FIG. 3 an electronic circuit for evaluating capacitance values of the pivot position sensors.

FIG. 3 shows an electronic circuit for evaluating capacitance values of the pivot position sensors. Preferably, the electronic circuit comprises a voltage divider consisting of a resistance R1 and the variable capacitance Cs of the sensor, in each case for one of the sensors 7a, 7b, 7c 7d, for forming a first or a second signal. Thereby, in particular, the resistance R1 is arranged between a voltage source with a voltage Uo and a tap of the voltage divider with a voltage Us. The capacitance of the sensor 7a, 7b, 7c, 7d is arranged between the tap of the voltage divider and the pivot 1, 2; 11. A diode D is arranged in series between the tap of the voltage divider and an amplifier input, as well as a smoothing capacitor C between the amplifier input and earth, for rectifying and smoothing the signal Us at the tap of the voltage divider. Preferably, the two diodes D are paired in each case by two sensors of a sensor pair, which means they are arranged in the same diode housing.

The two smoothed signals of a sensor pair are led to the two inputs of a differential amplifier X, Y. The output signal of the differential amplifier X, Y is a measure for the deviation of the pivot in the X direction or the Y-direction from the middle of the sensor. The temperature effects are kept small on account of the differential method. The outputs of the two differential amplifiers X, Y are digitalised by an A/D converter, and are processed further in a digital manner by way of a system controller. Of course, the interface between the analog and digital signal processing may also be realised at a different location of the circuit arrangement, with an equal overall function. The circuit for determining a pivot displacement may also be implemented in a purely analog manner.

The voltage source comprises an oscillator Osc and a driver Drv. A sinusoidal signal of the frequency f, for example approx. 1.5 MHz of the oscillator Osc, is amplified by the driver Drv, to a voltage Uo of for example approx. 2 Vpp. The resistances R1 with the capacitance Cs of the sensor electrode form a voltage divider. The resulting voltage Us at the tap of the voltage divider is rectified at the diode D and smoothed in C $$Us = U_0 \frac{\frac{1}{j2\pi f C_s}}{R_1 + \frac{1}{j2\pi f C_s}}$$

A resolution of 10-20 nm results with a sensor sensitivity of approx. 100 mV/micrometer, and with a noise of approx. 1 mV. With sensor distances corresponding to a bearing distance of 150 mm, this results in an angle sensitivity with respect to the rotation of the pivot 11 (about an axis perpendicular to the pivot 11) of about 0.1 microrad.

Preferably, the electronic circuit comprises a compensation circuit for the elimination of temperature influences, in particular a voltage divider R1-R2, and a circuit for rectifying and smoothing, which is constructed analogously to the circuits of the respective individual sensors 7a, 7b, 7c, 7d. With this, a reference voltage is produced, which is digitalised via the A/D converter. The influence of a varying signal amplitude Uo is thus eliminated by way of the measurement signals of the sensor pairs being related to the reference voltage.

| LIST OF REFERENCE NUMERALS | |
|---|---|
| 1 | horizontal pivot |
| 2 | vertical pivot |
| 3 | base |
| 4 | support |
| 5 | telescope body |
| 6 | ball bearing |
| 7, 7a . . . 7d | sensors |
| 11 | pivot |

LIST OF REFERENCE NUMERALS

| | |
|---|---|
| 12 | base carrier |
| 13 | fastening, screw |
| 14 | sensor element - carrier |
| 15 | insulator |
| 16 | electrode |
| 17 | electrode connection lead |

The invention claimed is:

1. An angle measurement apparatus for optical angle measurement, comprising:
 a telescope body (5) which is rotatably mounted about at least one pivot (1, 2; 11),
 wherein the pivot (1, 2; 11) is rotatably mounted at least two bearing locations (6), and the bearing locations (6) are distanced to one another in the direction of the pivot (1, 2; 11),
 wherein at least two sensor arrangements for detecting the position of the pivot (1, 2; 11) are arranged in each case at a measurement location along the pivot (1, 2; 11),
 wherein the measurement locations are distanced to one another in the direction of the pivot (1, 2; 11), and
 wherein at least one of the sensor arrangements comprises a group of capacitive sensors (7a, 7b, 7c, 7d), which at the measurement location detects a displacement of the pivot (1, 2; 11) in directions perpendicular to the axial direction.

2. An angle measurement apparatus according to claim 1, in which each of the at least one sensor arrangements comprises a first sensor pair (7a, 7b) and a second sensor pair (7c, 7d) with in each case two capacitive sensors,
 wherein the first sensor pair (7a, 7b) measures a displacement of the pivot (1, 2; 11) in a first direction orthogonally to the axial direction,
 the second measurement pair (7c, 7d) measures a displacement of the pivot (1, 2; 11) in a second direction orthogonally to the axial direction, and
 the first and the second direction are essentially orthogonal to one another.

3. An angle measurement apparatus according to claim 2, in which at least one measurement arrangement, in each case a first sensor (7a) of the first sensor pair (7a, 7b) and a first sensor (7c) of the second sensor pair, are arranged on a first sensor element carrier (14), and in each case a second sensor (7b) of the first sensor pair and a second sensor (7d) of the second sensor pair are arranged on a second sensor element carrier (14').

4. An angle measurement apparatus according to claim 1, in which the sensors in each case between the pivot (1, 2; 11) and an electrode (16) form a capacitance in accordance with the distance between the pivot (1, 2; 11) and the electrode (16).

5. An angle measurement apparatus according to claim 1, in which the pivot (1, 2; 11) is a horizontal pivot (1) and/or a vertical pivot (2).

6. An angle measurement apparatus according to claim 1, further comprising an electronic circuit which for at least one of the sensor pairs (7a, 7b; 7c, 7d), is designed for producing a first signal in accordance with the capacitance of the first sensor (7a, 7c), and a second signal in accordance with the capacitance of the second sensor (7b, 7d), as well as for forming a difference signal from the first and the second signal.

7. An angle measurement apparatus according to claim 6, in which the electronic circuit for, in each case, one of the sensors (7a, 7b, 7c, 7d), for forming the first or the second signal, comprises a voltage divider (R1, Cs) consisting of a resistance (R1) and the capacitance (Cs) of the sensor, wherein in particular the resistance (R1) is arranged between a voltage source (Osc, Drv) and a tap of the voltage divider, and the capacitance (Cs) of the sensor (7a, 7b, 7c, 7d) is arranged between the tap and the pivot (1, 2; 11).

8. An angle measurement apparatus according to claim 7, in which the electronic circuit comprises a circuit for rectifying and smoothing the signal at the tap of the voltage divider, having a diode (D) in series with the signal, and a smoothing capacitor (C) to earth.

9. An angle measurement apparatus according to claim 8, in which the two diodes (D) of two sensors of a sensor pair (7a, 7b; 7c, 7d) are arranged in the same diode housing.

10. An angle measurement apparatus according to claim 6, in which the electronic circuit comprises a compensation circuit for eliminating temperature influences, having a voltage divider and a circuit for rectifying and smoothing, which is constructed analogously to the circuits of the respective individual sensors (7a, 7b, 7c, 7d).

* * * * *